United States Patent
Hur et al.

(10) Patent No.: US 8,184,338 B2
(45) Date of Patent: May 22, 2012

(54) IMAGE FORMING APPARATUS AND METHOD FOR CONTROLLING PRINTING AND AUTO COLOR REGISTRATION

(75) Inventors: Jang-won Hur, Seoul (KR); Jin-su Yun, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 551 days.

(21) Appl. No.: 12/474,591

(22) Filed: May 29, 2009

(65) Prior Publication Data

US 2010/0118320 A1 May 13, 2010

(30) Foreign Application Priority Data

Nov. 7, 2008 (KR) ................. 2008-110555

(51) Int. Cl.
*H04N 1/50* (2006.01)
*H04N 1/58* (2006.01)
(52) U.S. Cl. ......... 358/1.9; 358/3.26; 358/504; 358/540
(58) Field of Classification Search .................. 358/1.9, 358/2.1, 3.24–3.27, 1.13–1.15, 501, 504, 358/518–521, 523, 527, 530, 532, 540
See application file for complete search history.

(56) References Cited

U.S. PATENT DOCUMENTS

| | | | | |
|---|---|---|---|---|
| 6,529,616 B1* | 3/2003 | Rasmussen et al. | ......... | 358/3.26 |
| 7,848,690 B2* | 12/2010 | Bae et al. | ....................... | 399/301 |
| 8,009,320 B2* | 8/2011 | Bae | ............................... | 358/504 |
| 2008/0137117 A1* | 6/2008 | Lee | ................................. | 358/1.9 |
| 2009/0027703 A1* | 1/2009 | Kim et al. | ....................... | 358/1.9 |
| 2010/0110512 A1* | 5/2010 | Jeon et al. | ....................... | 358/518 |
| 2010/0178084 A1* | 7/2010 | Kang et al. | ..................... | 358/1.9 |
| 2011/0085187 A1* | 4/2011 | Lee | ................................. | 358/1.9 |

\* cited by examiner

*Primary Examiner* — Scott A Rogers
(74) *Attorney, Agent, or Firm* — Staas & Halsey LLP

(57) ABSTRACT

A method for controlling printing of an image forming apparatus includes receiving a printing command from a user, determining whether a condition for auto color registration is satisfied, asking the user whether to perform auto color registration if the condition for auto color registration is satisfied, and performing either printing or auto color registration according to a response to the asked question. Accordingly, even though a condition for auto color registration is satisfied after a printing command is input, the user can select either printing time or printing quality according to his or her priority. Therefore, user convenience can be enhanced.

18 Claims, 5 Drawing Sheets

IMAGE FORMING APPARATUS AND METHOD FOR CONTROLLING PRINTING AND AUTO COLOR REGISTRATION

CROSS-REFERENCE TO RELATED APPLICATIONS

This application claims the benefit of Korean Application No. 2008-110555, filed Nov. 7, 2008, in the Korean Intellectual Property Office, the disclosure of which is incorporated herein by reference.

BACKGROUND OF THE INVENTION

1. Field of the Invention

Aspects of the present invention relate to an image forming apparatus and a method for controlling printing thereof, and more particularly, to an image forming apparatus that enables a user to select whether to perform auto color registration, and a method for controlling printing thereof.

2. Description of the Related Art

Auto color registration indicates registering the relative positions of different colors, e.g., four colors including yellow (Y), magenta (M), cyan (C), and black (K), when an image forming apparatus performs printing, which affects the image quality of a color printer using a single-pass method. Accordingly, the more frequently auto color registration is performed, the better the image quality is. However, in order to perform auto color registration once, an amount of toner and time are required, and the use of toner in performing auto color registration may be inefficient, resulting in waste of time and toner.

In particular, even when a user needs fast printing rather than a high quality printing, the user may have to unnecessarily wait for several seconds to several minutes for auto color registration to be performed.

SUMMARY OF THE INVENTION

Aspects of the present invention provide an image forming apparatus that enables a user to select whether to perform auto color registration when a condition for auto registration is satisfied after the user gives a printing command, and a method for controlling printing thereof. Additional aspects and/or advantages of the invention will be set forth in part in the description which follows and, in part, will be obvious from the description, or may be learned by practice of the invention.

According to aspects of the present invention, there is provided a method for controlling printing of an image forming apparatus, the method including receiving a printing command from a user, determining whether a condition for auto color registration is satisfied, asking the user whether to perform auto color registration if the condition for auto color registration is satisfied, and performing either printing or auto color registration according to a response to the asked question.

According to aspects of the present invention, the performing of either the printing or the auto color registration may include subsequently performing auto color registration if printing is performed, and subsequently performing printing if auto color registration is performed.

According to aspects of the present invention, the condition for auto color registration may be satisfied when the temperature of the inside of the image forming apparatus reaches a preset temperature, when at least one developing unit is replaced, when a sleep mode is maintained for a preset period of time, when a cover of the image forming apparatus is closed for a preset period of time, when a preset period time has passed, or when a printing command is received.

According to aspects of the present invention, the asking operation may include asking the user whether to perform auto color registration through a user interface of a user terminal device.

According to aspects of the present invention, the asking of the user may include asking the user whether to perform auto color registration through a user interface of the image forming apparatus.

According to aspects of the present invention, the asking of the user may include asking the user whether to perform auto color registration by transmitting the user electronic mail message (e-mail) or a text message (SMS).

According to aspects of the present invention, there is provided a method for controlling printing of an image forming apparatus, the method including receiving a printing command from a user, determining whether a condition for auto color registration is satisfied, and performing printing without performing auto color registration although the condition for auto color registration is satisfied.

According to aspects of the present invention, the receiving of the printing command may include receiving a command for an after-printing auto color registration mode, and the performing of the printing may include performing auto color registration after performing printing in the after-printing auto color registration mode.

According to aspects of the present invention, the receiving of the printing command may include receiving a command for an auto color registration skipping mode in which auto color registration is not performed.

According to aspects of the present invention, there is provided an image forming apparatus, including a processing unit to perform printing and auto color registration, an input unit to receive a printing command from a user, a determination unit to determine whether a condition for auto color registration is satisfied, and a control unit to ask the user whether to perform auto color registration if the condition for auto color registration is satisfied, and to control the processing unit to perform either printing or auto color registration according to a response to the asked question.

According to aspects of the present invention, the control unit may control the processing unit to subsequently perform auto color registration if printing is performed, and control the processing unit to subsequently perform printing if auto color registration is performed.

According to aspects of the present invention, the condition for auto color registration may be satisfied when the temperature of the inside of the image forming apparatus reaches a preset temperature, when at least one developing unit is replaced, when a sleep mode is maintained for a preset period of time, when a cover of the image forming apparatus is closed for a preset period of time, when a preset period time has passed, or when a printing command is received.

According to aspects of the present invention, the control unit may ask the user whether to perform auto color registration through a user interface of a user terminal device.

According to aspects of the present invention, the control unit may ask the user whether to perform auto color registration through a user interface of the image forming apparatus.

According to aspects of the present invention, the control unit may ask the user whether to perform auto color registration by transmitting the user electronic mail message (e-mail) or a text message (SMS).

According to aspects of the present invention, there is provided an image forming apparatus, including a processing unit to perform printing and auto color registration, an input unit to receive a printing command from a user, a determination unit to determine whether a condition for auto color registration is satisfied, and a control unit to control the processing unit to perform printing without performing auto color registration although the condition for auto color registration is satisfied.

According to aspects of the present invention, the input unit may receive a command for an after-printing auto color registration mode, and the control unit may control the processing unit to perform auto color registration after performing printing in the after-printing auto color registration mode.

According to aspects of the present invention, the input unit may receive a command for an auto color registration skipping mode in which auto color registration is not performed.

In addition to the example embodiments and aspects as described above, further aspects and embodiments will be apparent by reference to the drawings and by study of the following descriptions. Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
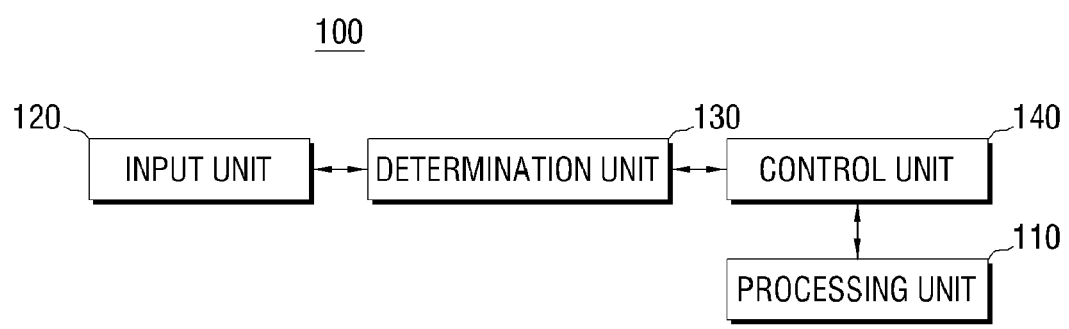
FIG. 1 is a schematic diagram of an image forming apparatus according to an example embodiment of the present invention.

Reference will now be made in detail to the present embodiments of the present invention, examples of which are illustrated in the accompanying drawings, wherein like reference numerals refer to the like elements throughout. Exemplary embodiments are described below in order to explain the present invention by referring to the figures.

FIG. 1 is a schematic diagram of an image forming apparatus 100 according to an example embodiment of the present invention. Referring to FIG. 1, the image forming apparatus 100 may include a processing unit 110, an input unit 120, a determination unit 130, and a control unit 140.

The processing unit 110 performs printing and auto color registration. Detailed description of the processing unit 110 will be given later. The input unit 120 receives a printing command from a user. More specifically, the input unit 120 receives a printing command from a wired user terminal device, such as a Universal Serial Bus (USB) cable, or a wireless user terminal device, such as a wireless local area network (LAN). The determination unit 130 determines whether a condition for auto color registration is satisfied.

After the input unit 120 receives a printing command, if the determination unit 130 determines that a condition for auto color registration is not satisfied, printing is performed without performing auto color registration.

A condition for auto color registration may be satisfied when the temperature of the inside of the image forming apparatus 100 reaches a preset temperature, when at least one developing unit is replaced, when a sleep mode is maintained for a preset period of time, when a cover of the image forming apparatus 100 is closed for a preset period of time, when a preset period time has passed, or when a printing command is received.

In greater detail, if the image forming apparatus 100 prints continuously for an amount of time, the temperature inside the image forming apparatus 100 increases, resulting in a driving roller expanding such that a diameter of the driving roller changes. Consequently, although the driving roller rotates with the same number of rotations, the moving speed of a transfer belt may change. Accordingly, if the temperature inside the image forming apparatus 100 reaches a preset temperature, a condition for auto color registration can be satisfied.

Alternatively, if at least one of developing units for cyan, magenta, yellow, and black (CMYK) is replaced, the position of the replaced developing unit may change compared with a preset or previous position. Accordingly, if at least one of the developing units is replaced, a condition for auto color registration can be satisfied.

Alternatively, if the sleep mode in which the image forming apparatus 100 does not perform printing is maintained for a certain period of time, a condition for auto color registration can be satisfied. Alternatively, if the cover of the image forming apparatus 100 is closed for a preset period of time, a condition for auto color registration can be satisfied.

Alternatively, auto color registration can be set to be performed at an interval of a preset period of time. Alternatively, auto color registration can be set to be performed whenever the image forming apparatus 100 receives a printing command. As described above, diverse conditions for auto color registration may be preset and/or pre-stored in a storage unit (not shown).

If a condition for auto color registration is satisfied, the control unit 140 asks the user whether the image forming apparatus 100 should perform auto color registration, and controls the processing unit 110 to perform printing or auto color registration according to the selection made by the user.

For example, the control unit 140 can ask the user whether the image forming apparatus 100 should perform auto color registration using a user interface. The user interface may be a pop-up window on a display screen of the user terminal device. The user terminal device may be a host computer which is connected to the image forming apparatus 100 via a cable or over a network.

For another example, the control unit 140 can ask the user whether to perform auto color registration using a user interface of the image forming apparatus 100. Generally, the user clicks (selects) a printing button on the display screen of the user terminal device and goes to the image forming apparatus 100 to take the printout. In this case, the user can directly answer a question that asks whether the image forming apparatus 100 should perform auto color registration through a display (not shown) of the image forming apparatus 100. The display of the image forming apparatus 100 may be a liquid crystal display (LCD), plasma display panel (PDP), or other display device. Further, the display of the image forming apparatus 100 may be a touch screen.

For yet another example, the control unit 140 can transmit the user an electronic mail message (e-mail) or a text message (SMS) asking whether to perform auto color registration. That is, the user can receive the question asking whether the image forming apparatus 100 should perform auto color registration via e-mail or a cellular phone. This method can be useful when the user does not know that such question is being displayed on the display of the image forming apparatus 100.

In the examples described above, if a preset period of time has passed, it can be set to perform one of printing and auto color registration according to a preset condition. The preset condition may be pre-stored in the storage unit (not shown).

The control unit 140 controls the processing unit 110 to perform printing or auto color registration. If the control unit 140 receives a response to not perform auto color registration from the user, the control unit 140 may control the processing unit 110 to perform auto color registration after completion of the printing.

Alternatively, if the control unit 140 receives a response to perform auto color registration from the user, the control unit 140 may control the processing unit 110 to perform the printing after completing auto color registration.

An image forming apparatus 100 according to another exemplary embodiment of the present invention may include a processing unit 110, an input unit 120, a determination unit 130, and a control unit 140 as shown in FIG. 1. The control unit 140 can control the processing unit 110 to automatically perform printing without performing auto color registration even if a condition for auto color registration is satisfied. That is, if a condition for auto color registration is satisfied, the image forming apparatus 100 accord may perform the printing according to an auto color registration skipping mode without asking the user whether the image forming apparatus 100 should perform auto color registration. In this case, the auto color registration skipping mode to not perform auto color registration as well as a printing command can be input through the input unit 120 by the user. If the user presses a button to select the auto color registration skipping mode on a printer driver setting window or on the image forming apparatus 100, the auto color registration skipping mode can be input.

If an after-printing auto color registration mode is input through the input unit 120, the control unit 140 controls the processing unit 110 to perform auto color registration after performing printing. Accordingly, the auto color registration skipping mode to not perform auto color registration when a printing command is received can be set, so user convenience can be enhanced. Although the image forming apparatus 100 according to the diverse embodiments of the present invention may not perform auto color registration, at least a minimum quality of printing which can be identified by the user may be maintained.

In a related-art image forming apparatus, if a condition for auto color registration is satisfied, auto color registration is automatically performed so as to maintain the printing quality. However, in the image forming apparatus 100 according to the diverse embodiments of the present invention, although a condition for auto color registration is satisfied after a printing command is input, the user can select whether the color registration should be performed, indicating a preference for time or quality, according to his or her priority. Therefore, user convenience can be enhanced.

Figure 2:
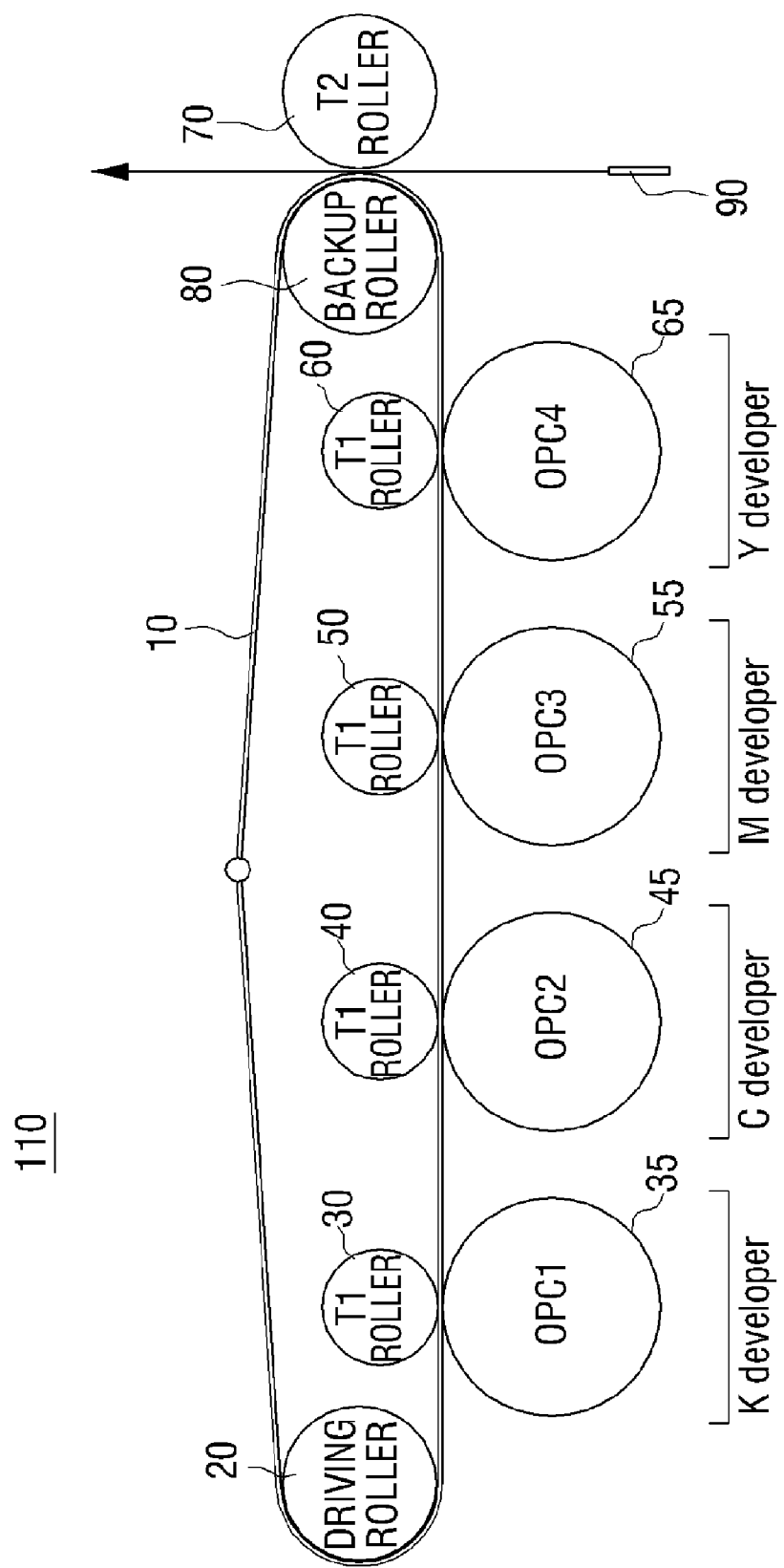
FIG. 2 is a schematic perspective view illustrating an example of a processing unit.
Figure 3A:
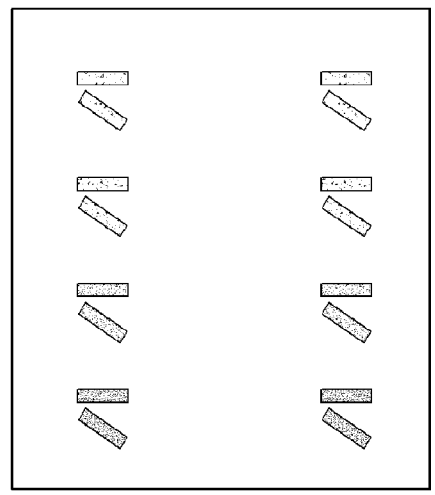
FIGS. 3A and 3B illustrate examples of a color registration pattern and a density pattern for auto color registration, respectively.
Figure 3B:
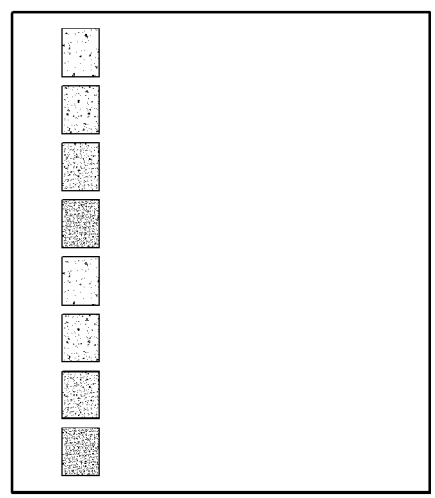

FIG. 2 is a schematic perspective view illustrating an example of the processing unit 110. FIGS. 3A and 3B illustrate examples of a color registration pattern and a density pattern for auto color registration, respectively. FIG. 2 shows a transfer belt 10 disposed about a driving roller 20 and a backup roller 80. First transfer rollers 30, 40, 50, and 60 (T1 Rollers) are disposed within the transfer belt 10. Photosensitive units 35, 45, 55, and 65 are disposed outside of the transfer belt 10 and respectively correspond to the first transfer rollers 30, 40, 50, and 60 such that the transfer belt 10 travels between and is compressed by the respective first transfer rollers 30, 40, 50, and 60 and photosensitive units 35, 45, 55, and 65 to transfer respective colors (K, C, M, and Y) to the transfer belt 10. A second transfer roller 70 (T2 Roller) is disposed outside of the transfer belt 10 to correspond to the backup roller 80 such that the transfer belt 10 travels between and is compressed by the second transfer roller 70 and the backup roller 80. Further, a medium 90 travels between the transfer belt 10 and the second transfer roller 70 (as indicated by arrow A) such that the colors transferred to the transfer belt 10 are then transferred to the medium 90.

Referring to FIGS. 2, 3A, and 3B, operation of the processing unit 110 is described in detail. The processing unit 110 forms a color registration pattern or a density pattern on the transfer belt 10 according to C, M, Y, and K developing units using the transfer rollers 30, 40, 50, and 60 and the photosensitive units 35, 45, 55, and 65, respectively.

More specifically, the processing unit 110 outputs a density pattern as illustrated in FIG. 3A, so if the output density is lower than a preset density, the color registration can be performed. Alternatively, the processing unit 110 outputs a color registration pattern as illustrated in FIG. 3B, so if misalignment between the output color registration pattern and an existing color registration pattern is higher than a threshold value, the color registration can be performed.

That is, the processing unit 110 adjusts transfer timing of each transfer roller 30, 40, 50, and 60 according to the degree of the output density or misalignment. For example, if it is determined that a C toner image is formed behind an intended position, the processing unit 110 advances the driving timing of the second transfer roller 40. Alternatively, if it is determined that a C toner image is formed in front of an intended position, the processing unit 110 delays or slows the driving timing of the second transfer roller 40. Thus, the processing unit 110 performs color registration.

In addition, the processing unit 110 can perform only printing without performing auto color registration even when a condition for auto color registration is satisfied.

In an image forming apparatus 100 according to another embodiment of the present invention, if the user gives priority to the printing quality of a printout, the user can set the image forming apparatus 100 to firstly perform auto color registration and then perform printing even when a condition for auto color registration is not satisfied.

In addition, the user can select whether to perform auto color registration of the image forming apparatus 100 even when the image forming apparatus 100 performs copying by scanning and printing an image rather than receiving a printing command.

Figure 4:
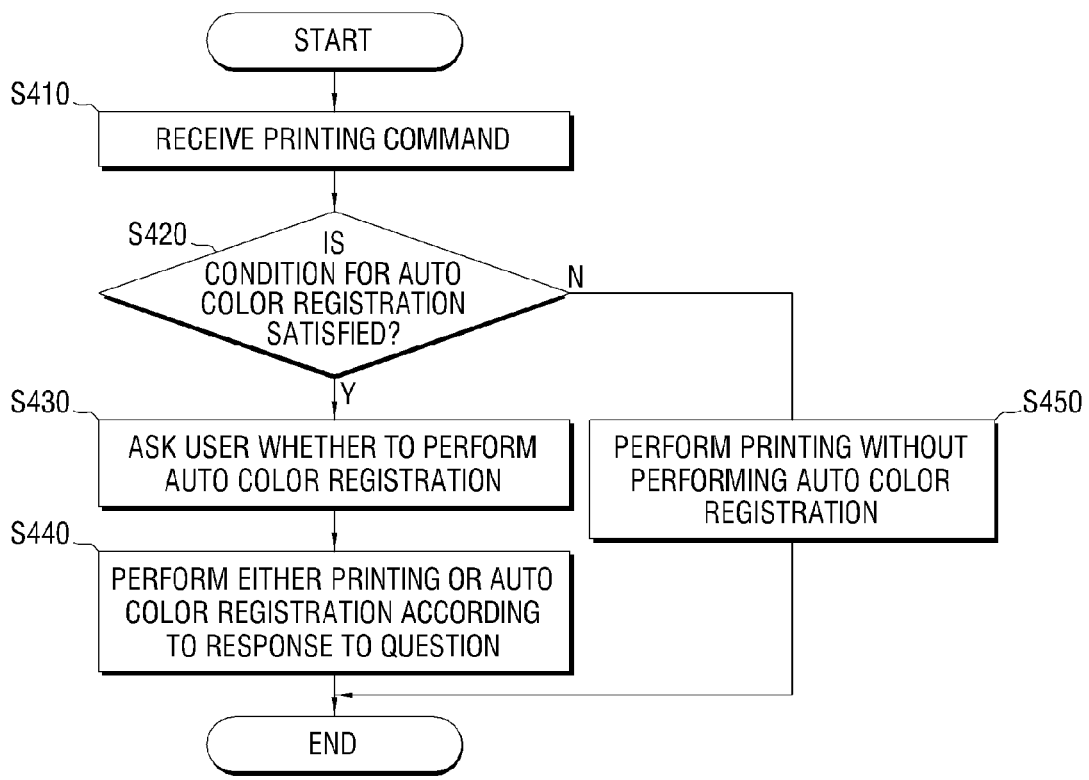
FIG. 4 is a flow chart illustrating a method for controlling printing of the image forming apparatus according to an example embodiment of the present invention.

FIG. 4 is a flow chart illustrating a method for controlling printing of the image forming apparatus 100 according to an example embodiment of the present invention. Referring to FIG. 4, an image forming apparatus receives a printing command from the user in operation S410, and determines whether a condition for auto color registration is satisfied in operation S420. If a condition for auto color registration is satisfied in operation S420-Y, the image forming apparatus asks the user whether the image forming apparatus 100 should perform auto color registration in operation S430. If the condition for auto color registration is not satisfied in S420-N, the image forming apparatus 100 performs the printing in operation S450 without performing auto color registration. The image forming apparatus 100 performs either printing or auto color registration according to a response to the question in operation S440.

Figure 5:
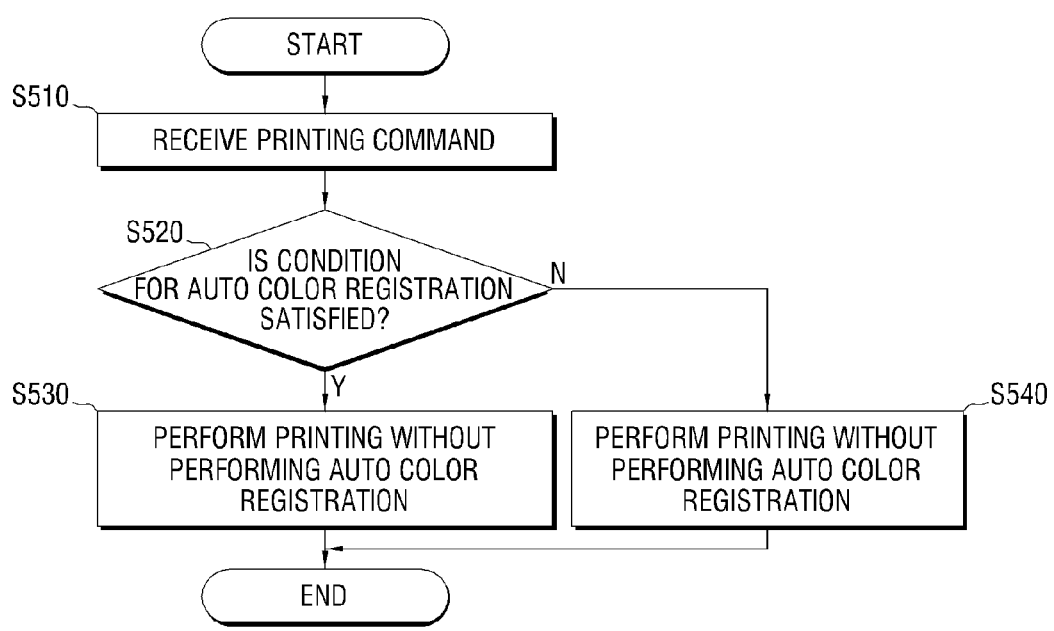
FIG. 5 is a flow chart illustrating a method for controlling printing of an image forming apparatus according to another example embodiment of the present invention.

FIG. 5 is a flow chart illustrating a method for controlling printing of an image forming apparatus according to another embodiment of the present invention. Referring to FIG. 5, the image forming apparatus receives a printing command from the user in operation S510, and determines whether a condition for auto color registration is satisfied in operation S520. Although a condition for auto color registration is satisfied in operation S520-Y, the image forming apparatus does not perform auto color registration and performs printing in operation S530. In this case, the auto color registration skipping mode to not perform auto color registration as well as a printing command can be input by the user. Accordingly, although a condition for auto color registration is satisfied, the image forming apparatus 100 can perform printing without performing auto color registration. Further, if the condition for auto color registration is not satisfied in operation S520-N, the image forming apparatus 100 can perform printing accordingly in operation S540 without performing auto color registration. Alternatively, the after-printing auto color registration mode can be input by the user, so printing is firstly performed and then auto color registration is performed.

Although a few exemplary embodiments of the present invention have been shown and described, it would be appreciated by those skilled in the art that changes may be made in such embodiments without departing from the principles and spirit of the invention, the scope of which is defined in the claims and their equivalents.

What is claimed is:

1. A method for controlling printing of an image forming apparatus, the method comprising:
   receiving a printing command from a user;
   determining whether a condition for auto color registration is satisfied;
   asking the user whether to perform auto color registration if the condition for auto color registration is satisfied; and
   performing either printing or auto color registration according to a response to the asked question.

2. The method of claim 1, wherein the performing of either the printing or the auto color registration comprises subsequently performing auto color registration if printing is performed, and subsequently performing printing if auto color registration is performed.

3. The method of claim 1, wherein the condition for auto color registration is satisfied when the temperature of the inside of the image forming apparatus reaches a preset temperature, when at least one developing unit is replaced, when a sleep mode is maintained for a preset period of time, when a cover of the image forming apparatus is closed for a preset period of time, when a preset period time has passed, or when a printing command is received.

4. The method of claim 1, wherein the asking of the user comprises asking the user whether to perform auto color registration through a user interface of a user terminal device.

5. The method of claim 1, wherein the asking of the user comprises asking the user whether to perform auto color registration through a user interface of the image forming apparatus.

6. The method of claim 1, wherein the asking of the user comprises asking the user whether to perform auto color registration via an electronic mail message (e-mail) or a text message (SMS).

7. A method for controlling printing of an image forming apparatus, the method comprising:
   receiving a printing command from a user;
   determining whether a condition for auto color registration is satisfied; and
   performing printing without performing auto color registration although the condition for auto color registration is satisfied.

8. The method of claim 7, wherein the receiving of the printing command comprises receiving a command for an after-printing auto color registration mode, and
   the performing of the printing comprises performing auto color registration after performing printing in the after-printing auto color registration mode.

9. The method of claim 7, wherein the receiving of the printing command comprises receiving a command for an auto color registration skipping mode in which auto color registration is not performed.

10. An image forming apparatus, comprising:
    a processing unit to perform printing and auto color registration;
    an input unit to receive a printing command from a user;
    a determination unit to determine whether a condition for auto color registration is satisfied; and
    a control unit to ask the user whether to perform auto color registration if the condition for auto color registration is satisfied, and to control the processing unit to perform either printing or auto color registration according to a response to the asked question.

11. The image forming apparatus of claim 10, wherein the control unit controls the processing unit to subsequently perform auto color registration if printing is performed, and controls the processing unit to subsequently perform printing if auto color registration is performed.

12. The image forming apparatus of claim 10, wherein the condition for auto color registration is satisfied when the temperature of the inside of the image forming apparatus reaches a preset temperature, when at least one developing unit is replaced, when a sleep mode is maintained for a preset period of time, when a cover of the image forming apparatus is closed for a preset period of time, when a preset period time has passed, or when a printing command is received.

13. The image forming apparatus of claim 10, wherein the control unit asks the user whether to perform auto color registration through a user interface of a user terminal device.

14. The image forming apparatus of claim 10, wherein the control unit asks the user whether to perform auto color registration through a user interface of the image forming apparatus.

15. The image forming apparatus of claim 10, wherein the control unit asks the user whether to perform auto color registration via an electronic mail message (e-mail) or a text message (SMS).

16. An image forming apparatus, comprising:
    a processing unit to perform printing and auto color registration;
    an input unit to receive a printing command from a user;
    a determination unit to determine whether a condition for auto color registration is satisfied; and
    a control unit to control the processing unit to perform printing without performing auto color registration although the condition for auto color registration is satisfied.

17. The image forming apparatus of claim 16, wherein the input unit receives a command for an after-printing auto color registration mode, and
    the control unit controls the processing unit to perform auto color registration after performing printing in the after-printing auto color registration mode.

18. The image forming apparatus of claim 16, wherein the input unit receives a command for an auto color registration skipping mode in which auto color registration is not performed.

* * * * *